United States Patent Office 2,723,425
Patented Nov. 15, 1955

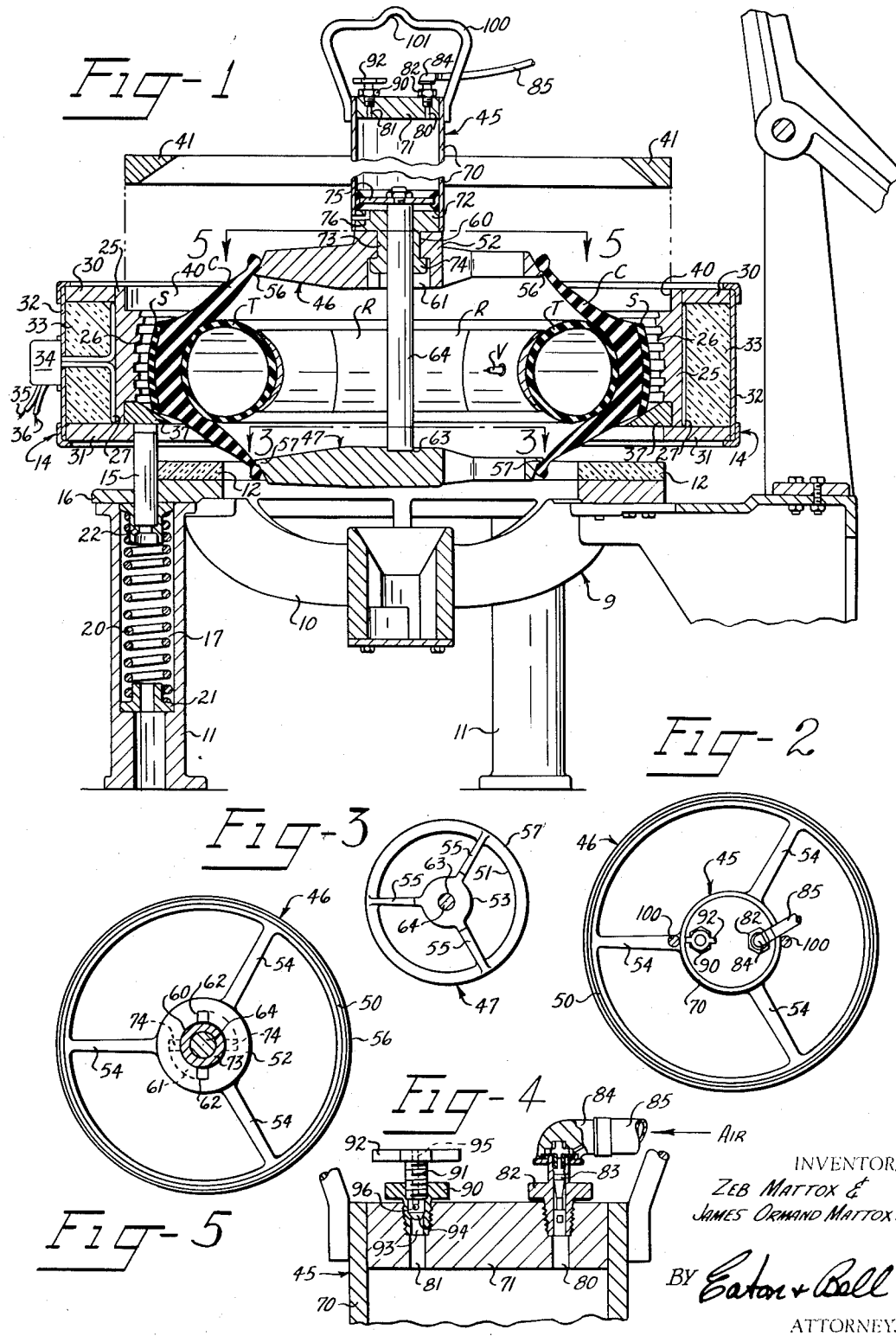

2,723,425

TIRE BEAD SPREADING DEVICE

Zeb Mattox and James Ormand Mattox, Charlotte, N. C., assignors, by direct and mesne assignments, to Precision Recapping Equipment Company, Bibb County, Ga., a corporation Original application October 11, 1952, Serial No. 314,366, now Patent No. 2,712,156, dated July 5, 1955. Divided and this application January 7, 1953, Serial No. 330,089

5 Claims. (Cl. 18—18)

This invention generally relates to the art of recapping and/or retreading pneumatic tire casings and, more especially, to an improved pneumatic means for drawing the beads on opposite sides of the casing apart in an axial direction to correspondingly reduce the tread diameter of the casing until it will pass within a mold matrix having the same internal diameter as the normal external diameter of the tire casing.

This application is a division of the co-pending application of Harris E. Potter, Zeb Mattox, and James Ormand Mattox, Serial No. 314,366 now Patent No. 2,712,156, filed October 11, 1952, and entitled Tire Retreading Apparatus.

In said co-pending application there is disclosed an improved tire recapping machine with which a continuous annular mold matrix is employed and wherein the face of the matrix is provided with ridges which mold the desired design in the camel back or tread strip, applied about the periphery of the tire casing, during the curing operation. The mold face of this type of matrix is of an internal diameter substantially equal to the normal external diameter of the tire casing before the casing has become worn or after the camel back or tread strip has been applied to it.

Accordingly, in order to insert the tire casing with the camel back or tread strip thereon in the annular mold matrix, it is necessary to substantially reduce the tread or external diameter of the casing until it will pass within the circular opening of the annular mold matrix. This operation is also necessary in order to facilitate the removal of the casing from the mold matrix following the curing operation.

In order to reduce the external or tread diameter of the casing, it is the primary object of this invention to provide an improved bead spreader comprising a pair of rims or wheels each having an annular bead spreading flange thereon adapted to fit inside of the tire casing and against the proximal or inner surfaces of the bead portions of said casing and wherein one of the rims or wheels has a means for removably connecting one end of a pneumatic cylinder thereto. The pneumatic cylinder has a piston therein to which one end of a piston rod is connected and said piston rod extends through the end of the cylinder which is removably connected to one of the rims and the free end of the piston rod is adapted to be forced, by compressed air entering the pneumatic cylinder, against the proximal surface of the hub of the other of said rims or wheels and to thereby force the wheels to move apart from each other. In so doing, the wheels force the beads of the tire casing apart in an axial direction, correspondingly reducing the tread or external diameter of the casing until it will pass within the circular opening of the mold matrix.

It is still another object of this invention to provide a device of the character last described wherein the first of the rims or wheels has a bayonet slot therein and one end of the cylinder has an extended portion thereon provided with lugs or keys on the outer end thereof which are adapted to fit into the bayonet slot of the first rim or wheel thereby facilitating ease in mounting or demounting the cylinder, and connecting or disconnecting the cylinder, relative to the first of said rims. Of course, the piston rod slidably penetrates the end of the cylinder having the projection thereon and it is also an object of this invention to provide a cavity in the hub of the second rim or wheel adapted to receive the corresponding or free end of the piston rod to thereby further insure that the piston rod is maintained in an axial position relative to the rims or wheels during the bead spreading operation.

Some of the objects of the invention having been stated, other objects will appear as the description proceeds, when taken in connection with the accompanying drawings in which—

Figure 1 is a vertical sectional view through the central portion of a tire retreading apparatus of the type disclosed in said co-pending application and showing the improved bead spreader in association therewith;

Figure 2 is a top plan view of the improved bead spreading device disassociated from the tire casing and mold matrix with a portion of the handle on the pneumatic cylinder being broken away for purposes of clarity;

Figure 3 is a top plan view of the lower or second rim or wheel of the bead spreader being taken substantially along the line 3—3 in Figure 1, but showing the rim at a reduced scale and also showing the piston rod in cross-section;

Figure 4 is an enlarged fragmentary vertical sectional view of the upper portion of the cylinder shown in Figure 1;

Figure 5 is a sectional plan view taken substantially along the line 5—5 in Figure 1, but omitting the tire casing and showing the lower portion of the cylinder base in cross-section.

Referring more specifically to the drawing, there is shown in Figure 1 a mold stand 9 of the type disclosed in said co-pending application and which includes a cast annular base 10 supported on circularly arranged legs 11 and having an insulation ring 12 fixed to the upper surface thereof for supporting a continuous annular mold matrix broadly designated at 14 when said matrix is moved to lowered position. The mold matrix 14 is held in spaced relation above the insulation ring 12 of the base 10, during the insertion or removal of a tire casing C relative to the mold matrix 14, by means of a plurality of spring loaded matrix lift plungers 15 which are mounted for vertical sliding movement in circular boss portions 16 integral with the annular base 10.

The legs 11 are suitably secured to the circular boss portions 16, only one of which is shown in Figure 1, and each of the legs 11 has a cavity 17 therein in which a compression spring 20 is disposed. The lower end of the compression spring 20 bears against a spring base 21 resting upon the bottom of the cavity 17 and the upper end of the spring 20 bears against a plunger pilot member 22 which is normally urged against the lower surface of the corresponding circular boss portion 16 by the compression spring 20. The lower end of each plunger 15 is suitably secured, as by a pressed fit, in the corresponding plunger pilot member 22.

The annular mold matrix 14 comprises an undivided or annular metallic heat transmitting mold member 25 having an inner tread face with projecting ridges 26. The diameter of the inner tread face of the annular mold member 25 is substantially the same as the normal external diameter of a casing C before it has become worn or after it has had a tread strip or strip of camel back S applied to the periphery thereof.

During the curing operation, the casing C has an inflatable and deflatable tube I therein provided with a conventional valve stem V which projects through a curing rim R. The curing rim R is usually made in segments which fit in the opening formed by the curing tube T. The curing rim R may be of the type shown in U. S. Patent No. 2,398,151.

The outer face of the mold member 25 is preferably provided with an electric heating element 27 in close proximity thereto, but suitably insulated therefrom, the heating element being suitably arranged to distribute the heat uniformly over the surface of the mold member 25. The heating element 27 is enclosed in an annular boxing comprising flat upper and lower rings 30 and 31, the upper ring 30 being suitably secured to the periphery of the mold member 25 with its upper face substantially flush with the upper face of the mold member 25. The lower ring 16 is suitably secured to the lower edge of the mold member 25 and its inner diameter is such that it slidably engages the outer surfaces of the circularly arranged matrix lift plungers 15.

The rings 30 and 31 are of substantially the same outside diameter and have a cylindrical shell 32 suitably secured thereto thus defining an annular cavity which is filled with a suitable insulation material 33, such as rock wool or the like.

It will be observed in the left-hand portion of Figure 1 that opposite ends of the heating element 27 extend outwardly through the cylindrical shell 32 and are connected to a suitable thermostatically controlled switch 34 having wires 35 and 36 extending therefrom adapted to be connected to a suitable source of electrical energy, not shown. The mold member 25 has a lower side flange 37 extending inwardly beyond the peaks of the ridges 26, which flange 37 may be integral with the mold member 25 or fitted in the lower portion thereof as shown in Figure 1. The mold member 25 also has a peripheral rabbet or groove 40 in the upper inner edge thereof in which a removable upper side flange 41 may be freely seated.

The upper side flange 41 is substantially of the same cross-sectional configuration as the lower side flange 37 and, since the removable upper flange 41 must be clamped in the groove 40 during the molding process, the depth of the groove 40 is necessarily slightly less than thickness or height of the flange 41 at the outer portion thereof. The flange 41 is shown spaced above the mold matrix 14, since it is not inserted in the groove 40 while the improved bead spreading device is in use. The flanges 37 and 41 extend inwardly for a distance which defines the inner limit of the molding chamber.

It is evident that the inner diameter of the mold matrix measured between the tops or proximal surfaces of the tread ridges 26 is less than the diameter of the casing C with the uncured tread strip S attached to thereby avoid stretching of the casing during the curing operation to make the tread strip fit the mold. However, the mold matrix is sufficiently large to encompass the casing with tread strip attached without compressing the casing when the thickness of the tread strip has been reduced by the flow of part of the substance thereof into the grooves between the ridges 26 to fill the same so that, in the finished uninflated tire, the casing is not circumferentially constricted by the tread strip while the latter will not be under tension when the tire is not inflated.

Accordingly, the diameter of the tire casing C must be reduced when the casing C is inserted in the mold member. Although other means have heretofore been provided for reducing the diameter of the casing C to substantially less than its normal diameter, we have provided an improved pneumatically operated bead spreading device for this purpose which will now be described in detail.

The improved bead spreading device generally comprises a cylinder assembly broadly designated at 45, an upper or first bead spreading wheel or rim broadly designated at 46 and a lower or second bead spreading wheel or rim broadly designated at 47. The upper and lower bead spreading wheels or rims 46 and 47 comprise respective annular portions or rings 50 and 51 which are connected to respective hubs 52 and 53 by means of circularly spaced radial spokes 54 and 55, respectively.

The spokes 54 and 55 are preferably cast integral with the respective annular portions 50 and 51 and the respective hubs 52 and 53. Ordinarily, the wheels or rims 46 and 47 may be of solid construction, however, the spokes 54 and 55 are provided on the respective spreader wheels or rims 46 and 47 to minimize the weight of the rims 46 and 47 and to also provide openings in the upper rim or bead spreading wheel 46 through which an air hose may be inserted for inflating the tube T while the bead spreading wheels 46 and 47 are positioned between the beads of the casing C, if so desired.

The peripheral surfaces of the annular portions 50 and 51 of the respective bead spreading wheels or rims 46 and 47 are preferably beveled or tapered, as is most clearly shown in Figure 1, and the proximal portions of the annular portions of the bead spreading wheels or rims 46 and 47 are provided with respective peripheral bead spreading flanges 56 and 57 which are adapted to engage the proximal surfaces of the beads of the tire casing C during the bead spreading operation as shown in Figure 1.

The hub 52 of the upper bead spreading wheel or rim 46 projects upwardly above the spokes 54 and has a circular cavity or bore 60 therein and the lower portion of the hub 52 has substantially quarter-circular cavities therein to form a bayonet slot 61 therein, as shown in Figure 5, and in alinement with the walls of which the hub is provided with diametrically opposed key slots 62 in the upper portion thereof for purposes to be later described. The upper surface of the center of the hub 53 of the lower or bottom bead spreading wheel or rim 47 has a shallow, preferably circular, cavity 63 therein which is adapted to receive the free lower end of a piston rod 64 which is a part of the cylinder assembly 45 to be presently described.

The cylinder assembly 45 comprises a cylinder tube 70 which has a cylinder head 71 suitably secured to the upper end thereof and a cylinder base 72 suitably secured to the lower end thereof. The cylinder base 72 has an axially alined circular projection 73 on the lower end thereof, the lower end of which is provided with a pair of outwardly projecting lugs or keys 74 disposed in diametrically opposed relation to each other.

It will be noted that the projection 73 on the cylinder base 72 is adapted to slidably fit in the circular cavity or bore 60 in the hub 52 of the upper bead spreading wheel 46. The key portions 74 are of such size that they may be slidably inserted in the corresponding keyways 62 in the hub 52 whereupon the cylinder assembly 45 may be rotated a quarter revolution to lock the key portions 74 on the lower end of the projection 73 of the cylinder base 72 in the bayonet slot 61 as shown in Figures 1 and 5. It is evident that the lower cavities forming the bayonet slot 61 may be formed as a circular cavity, however, the bayonet slot 61 is preferably formed in diametrically opposed quadrants, as shown in Figure 5, in order to limit rotative movement of the cylinder assembly 45 and to thereby assist the operator in determining that the key portions 74 are properly positioned in the bayonet slot 61.

Now, the piston rod 64 is mounted for sliding or free axial movement in the hub or projection 73 and the cylinder base 72 and has a suitable piston 75 fixed to the upper or inner end thereof. In order to permit ingress and egress of air from within the cylinder tube 70 between the piston 75 and the cylinder base 72 during movement of the piston 75, the cylinder base 72 has a suitable air escapement passageway 76 therein which communicates with the interior and the exterior of the cylinder tube 70.

The cylinder head 71 is provided with a pair of spaced parallel passageways 80 and 81 which may be respectively termed as an air ingress passageway and an air egress passageway. The upper end of the air ingress passageway 80 is closed by a suitable check-valve 82 suitably mounted in the upper portion of the cylinder head 71 and which has a suitable check-valve mechanism therein generally designated at 83. This valve mechanism 83 is preferably of the type usually employed in the valve stems of pneumatic tire tubes and, therefore, a detailed description is deemed unnecessary.

The reduced upper portion of the valve 82 is adapted to receive the open end of a conventional air chuck 84 on one end of an air hose or conduit 85 of the type usually employed in tire recapping shops and which may be connected to a suitable source of compressed air, not shown. The air chuck 84 and the check-valve mechanism 83 in the check-valve 82 may be of the usual type manufactured by A. Schrader's Sons, 470 Lafayette Blvd., Brooklyn, New York.

Of course, the air hose 85 may be flexible and be permanently connected to the cylinder head 71 for communication with the air ingress passageway 80 and have a suitable manually operable valve interposed therein in lieu of the check valve 82, if so desired. However, the bead spreading device and the casing may be more conveniently handled when a separable check-valve and air chuck is employed as shown in Figures 1 and 4.

In order to release the compressed air from the cylinder tube 70, the upper end of the air egress passageway 81 is closed by a manually operable valve assembly including a housing 90 threadably mounted in the upper portion of the cylinder head 71 and in which a valve member 91 is threadably mounted. The valve member 91 has a suitable handle 92 on the upper end thereof to facilitate manual rotation of the threaded valve member 91 for opening and closing a passageway 93 in the lower portion of the valve housing 90. The passageway 93 communicates with the air egress or discharge passageway 81. It will be noted that the passageway 93 is of relatively smaller diameter than the lower portion of the valve member 91 and the lower end of the valve member 91 is tapered as at 94. The valve member 91 has a longitudinally extending cavity 95 therein which is open at its upper end and the reduced lower portion of the valve member 90 has a transverse passageway or bore 96 therein which communicates with the lower end of the cavity 95.

Thus, when the valve member 91 is loosened relative to the valve body or housing 90 the compressed air in the cylinder tube 70 is permitted to escape through the passageways 81 and 93, between the reduced lower portion of the valve member 91 and the inner wall of the valve body 90 and, thence, through the passageway 96 and cavity 95 to the atmosphere. Of course, when the valve member 91 is tightened in the valve body 90, the tapered lower portion 94 thereof closes the upper end of the passageway 93 to prevent compressed air from escaping from the cylinder tube 70.

Although the check valve 82 and the shut-off valve comprising the housing 90 are specifically illustrated, it is evident that different types of valves may be employed in lieu of the valve 82 and the valve comprising housing 90 without departing from the spirit of the invention.

The beads of the tire casing are usually spread apart from each other while the tire casing is resting upon the floor and before positioning the tire casing upon the mold matrix 14. On the other hand, after the curing operation has been completed, the beads of the casing are spread apart from each other and the tire casing is usually positioned upon the floor before the improved bead spreader is removed therefrom. In order to facilitate carrying the bead spreader with the tire casing, the upper end of the cylinder tube 70 of the cylinder assembly 45 has an inverted substantially U-shaped handle 100 suitably secured thereto and the horizontal portion of which is bent upwardly intermediate its ends to form a centrally disposed notch 101 therein for reception of the hook of a suitable hoist or the like for raising and lowering the improved bead spreader and the tire casing C.

In operation, the annular mold matrix 14 is usually positioned upon the matrix left plungers 15 is shown in Figure 1 and the casing with the uncured tread strip or camel back cemented thereto is placed upon the floor or a suitable table adjacent the mold stand and the inflatable tube T inserted in the tire casing C in collapsed condition, after which the curing rim R is inserted. Then, the rims or spreader wheels 46 and 47 are separately inserted in the casing, the flanges 56 and 57 being inserted in the openings surrounded by the beads of the tire casing C by tilting the rims and forcing the flanges through the openings in a substantially diametrical plane.

When the rims are then placed parallel, the flanges 56 and 57 will not escape from the beads. The tapered peripheral edges of the annular portions 50 and 51 of the respective rims or bead spreading wheels 46 and 47 assist in positioning these annular portions 50 and 51 within the openings defined by the beads of the tire casing C. When the rims are initially within the casing C, the flange 57 of the lower rim 47 rests against the lower bead of the tire casing while the upper rim 46 rests upon the lower rim 47.

The key portions 74 on the cylinder base 72 of the cylinder assembly 45 are then inserted in the key slots 62 of the upper bead spreading wheel or rim 46. As the key portions 74 on the cylinder base 72 of the cylinder assembly 45 are inserted in the key slots 62 in the hub of the upper bead spreading wheel or rim 46, the lower end of the piston rod 64 is seated in the circular cavity 63 in the center of the hub 53 of the lower bead spreading wheel or rim 47. The operator then gives the cylinder assembly 45 substantially a quarter turn in a clockwise direction in Figure 5 to thereby lock the lower end of the cylinder assembly 45 in engagement with the bayonet slot 61 in the hub 52 of the upper bead spreading wheel or rim 46.

It is only necessary for the operator to then press the air chuck 84 on the end of the air hose 85 against the upper end of the check valve 82 to admit compressed air to the interior of the cylinder tube 70 and this will force the piston 75 and piston rod 64 outwardly relative to the cylinder tube 70 and the cylinder base 72 to move the upper rim 46 in an upward direction away from the lower rim 47 during which the tapered peripheral surface of the annular portion 50 of the upper rim 46 will lead the upper rim into the opening defined by the upper bead of the tire casing C until the flange 56 thereon engages the bead.

At this time the further separation of the bead spreading wheels or rims 46 and 47 will cause the beads of the tire casing C to be spread apart from each other as shown in Figure 1 and, of course, as the beads separate, the diameter of the casing C diminishes. A little practice teaches how much separation is required to reduce the diameter of the casing to the proper extent for insertion in the annular mold member 25 of the mold matrix 14.

When the beads of the casing C have been separated the desired amount, the chuck 84 on the air hose may be removed from the check-valve 82 and the tire casing C, together with the improved bead spreader, is ready for insertion into the annular mold member 25. Since the side walls of the tire casing C diverge inwardly from the tread face when the beads are in spread condition, the matrix lift plungers 15 support the annular mold matrix 14 in spaced relation above the platform or annular insulation ring 12 on the base 10 of the mold stand as set forth in said co-pending application Serial Number 314,366, now Pat. No. 2,712,156. Thus, this permits the portion of the casing adjacent the tread strip S to rest upon the lower flange 37 of the annular mold matrix 14 as shown in Figure 1.

While the beads of the tire casing C are in spread condition as shown in Figure 1, the tube T is partially inflated by extending the chuck 84 with the hose 85 thereon through one of the openings defined by adjacent spokes 54 of the upper bead spreading wheel or rim 46 thereby permitting access to the valve stem V. The valve of the chuck 84 and its air hose 85 are then removed through the opening defined by adjacent spokes 54 and the casing C is then permitted to expand to position the tread strip S against the ridges 26 on the annular mold member 25.

For inserting the casing it is merely necessary to open the valve member 91 to release the compressed air from the cylinder tube 70 of the cylinder assembly 45 whereupon the inherent resiliency of the walls of the tire casing C cause the beads thereof to move inwardly toward each other to their normal position, during which the outer lower portion of the casing C slides against the surface of the lower flange 37 of the annular mold matrix 14 and is thereby automatically diametrically centered; so that the median diametrical planes of the annular mold member 25 and the casing C then coincide as the diameter of the casing increases until it obtains a frictional hold against the tread face of the mold member 25.

The improved bead spreader is then removed from the tire casing by turning the cylinder assembly substantially a quarter revolution so that the key portions 74 thereon register with the key slots 62, whereupon the cylinder assembly 45 is removed from the bead spreading wheels 46 and 47. The bead spreading wheels are then removed from the tire casing in substantially the reverse of the manner in which they were originally inserted therein and, then, the tube T is inflated to its desired operating pressure during the curing process. After the improved bead spreader has been removed from the tire casing C the upper annular flange 41 is positioned in the groove 40 so that it bears against the upper side wall of the casing C and the mold matrix 14 is then clamped against the platform, embodied in the insulation ring 12, in the manner set forth in said co-pending application during the curing process.

Of course, when the curing process is completed, the molded ridges on the tread face of the casing interdigitate with the ridges 26 on the tread face of the annular mold member 25. To eject the casing, the tube T is deflated and the improved bead spreader is inserted in the tire casing in the manner heretofore described, whereupon the valve member 91 is again closed and compressed air is admitted to the cylinder tube 70 to again spread the beads of the casing C apart from each other. Of course, this reduces the diameter of the casing C and also forces the upper annular flange 41 outwardly to readily facilitate its removal from the annular groove 40 in the upper portion of the annular mold member 25. When the diameter of the casing C is reduced to the point at which the tread of the casing disengages from the tread ridges of the mold, the cylinder assembly 45 with the spreader wheels 46 and 47 and the tire casing C are lifted out of the annular mold member 25, either manually or by a suitable hoist, and then placed upon the floor or upon a suitable table adjacent the mold stand 9. The valve member 91 is then again opened to release the compressed air from the cylinder tube of the cylinder assembly 45 to facilitate removal of the improved bead spreader from the tire casing to thereby complete the recapping operation.

It is thus seen that we have provided an improved bead spreader for use in the process of recapping or retreading pneumatic casings which is more simply operated than other types of bead spreading devices heretofore in use and which includes a minimum of parts and also operates with much more efficiency and greater speed than any similar devices heretofore available.

It might be stated that a bead spreading device of this type could not have been used with mold stands wherein a continuous annular mold matrix was heretofore employed due to the fact that a center post, whose lower end was fixed on the base of the mold stand, has heretofore been employed, however, the improved mold stand or machine disclosed in said co-pending application has a centerpost which is moved upwardly clear of the mold matrix when the mold matrix 14 and the tire casing C are placed upon the mold stand and, therefore, does not encumber the operation of the improved bead spreading device.

In the drawings and specification there has been set forth a preferred embodiment of the invention and, although specific terms are employed, they are used in a generic and descriptive sense only, and not for purposes of limitation, the scope of the invention being defined in the claims.

We claim:

1. Apparatus for spreading the beads of a tire casing comprising a first spreader rim, a second spreader rim, peripheral flanges on said rims adapted to engage the proximal surfaces of the beads of a tire casing, said first rim having an axial opening therethrough, an air cylinder assembly including a tube, a cylinder head and a base fixed on opposite ends of said tube, means to removably attach the base of the cylinder assembly to the outer surface of, and in substantially axial alinement with, said first rim, said cylinder assembly also having a piston rod movably penetrating said base and adapted to extend through the opening in said first rim and to engage the second rim, means for introducing compressed air into said tube to cause the piston rod to move outwardly relative to said base for forcing said rims apart from each other to thereby spread the beads of the casing, and manually operable valve means on said cylinder head for releasing the compressed air from said tube.

2. In a structure according to claim 1, said second spreader rim having a centrally located shallow cavity in its surface adjacent the first spreader rim and in which the outer end of the piston rod is positioned during the bead spreading operation.

3. A bead spreading device for spreading the beads of a tire casing to reduce the diameter of the casing comprising first and second bead spreading wheels each having a tapered peripheral surface, said bead spreading wheels being adapted to be positioned in axial alinement with each other within the openings defined by the beads of the tire casing, each of said wheels having a peripheral flange thereon, said flanges being adapted to engage the proximal surfaces of the beads of the tire casing during the bead spreading operation, a cylinder assembly including a cylinder tube, a cylinder head and a cylinder base, means for detachably connecting the cylinder base to the first bead spreading wheel, a piston in said cylinder tube, a piston rod loosely penetrating said cylinder base and said first wheel and being adapted to bear against the proximal surface of said second spreader wheel, means for directing compressed air into said cylinder to force the piston rod outwardly relative to the cylinder base to thereby force the beads of the casing apart from each other, and manually operable means mounted on the cylinder head for releasing the compressed air from the cylinder to release the beads of the tire casing.

4. An improved tire casing bead spreader for use with a tire recapping apparatus of the type wherein the casing with uncured tread strip attached is inserted into an annular tread molding matrix, said bead spreader comprising first and second rims each having a bead engaging flange thereon for insertion within the bead openings, said flanges being adapted to engage the proximal surfaces of the beads of the tire casing, the first rim having an axial bore therethrough, said first rim also having an axially positioned bayonet slot in its side thereof adjacent the second rim, a cylinder assembly comprising a cylinder tube, a cylinder head and a cylinder base, said cylinder base having an axial projection thereon adapted to fit in said axial bore, key portions on said projection adapted to fit into said bayonet slot in the first rim, a piston in said tube, a piston rod fixed to said piston and penetrating said cylinder base, a check valve in the cylinder head facilitating admittance of compressed air into the cylinder tube whereby said piston rod will be forced against the second rim while the key portions on the projection on the base of the cylinder assembly are locked in the bayonet slot to thereby force the rims apart from each other for spreading the beads of the tire casing, and a manually operable pressure release valve in the cylinder head for releasing the compressed air from the cylinder tube to permit the rims to move toward each other and to thereby permit the beads of the casing to return to their normal position.

5. An improved tire casing bead spreader for use with a tire recapping apparatus of the type wherein the casing with uncured tread strip attached is inserted into an annular tread molding matrix, said bead spreader comprising first and second rims each having a bead engaging flange thereon for insertion within the bead openings, said flanges being adapted to engage proximal surfaces of the beads of the tire casing, said first rim having an axial bore in one end thereof and a pair of diametrically opposed substantially quarter-circular cavities of greater diameter than said bore in the other end thereof, said first rim also having a pair of diametrically opposed key slots in the end thereof in which said bore is disposed and whose distal walls conform substantially with the walls of the respective quarter-circular cavities, a cylinder assembly comprising a cylinder tube, a cylinder head and a cylinder base, said cylinder base having a projection thereon adapted to fit in said axial bore, key portions on said projection adapted to fit into said slots and said quarter-circular cavities in said first rim, a piston in said cylinder tube, a piston rod fixed to said piston and axially penetrating said cylinder base, a check valve in the cylinder head facilitating admittance of compressed air to the cylinder tube whereby said piston rod will be forced against the second rim while the key portions on the projection on the head of the cylinder assembly are locked in the quarter-circular cavities to thereby force the rims apart from each other for spreading the beads of the tire casing, and a manually operable pressure release valve in the cylinder head for releasing the compressed air from the cylinder tube to permit the rims to move toward each other and to thereby permit the beads of the casing to return to normal position.

References Cited in the file of this patent
UNITED STATES PATENTS

| | | |
|---|---|---|
| 2,302,133 | Maze | Nov. 17, 1942 |
| 2,353,570 | Kraft | July 11, 1944 |
| 2,475,579 | Napier | July 5, 1949 |
| 2,712,156 | Potter et al. | July 5, 1955 |